Jan. 8, 1929.
F. H. OWENS
1,698,106
MOTION PICTURE APPARATUS
Filed Jan. 27, 1926
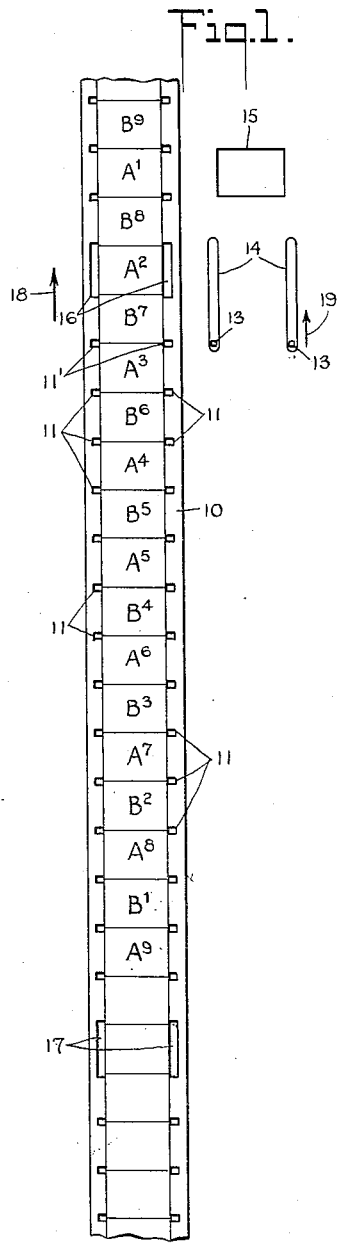
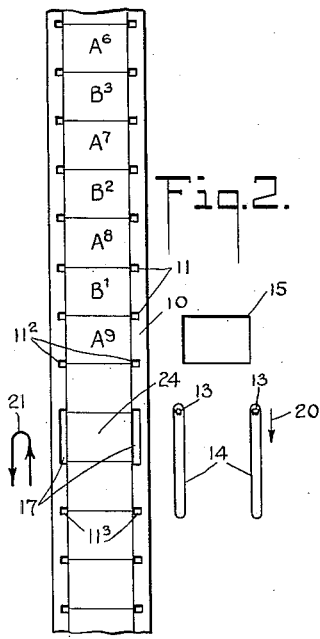
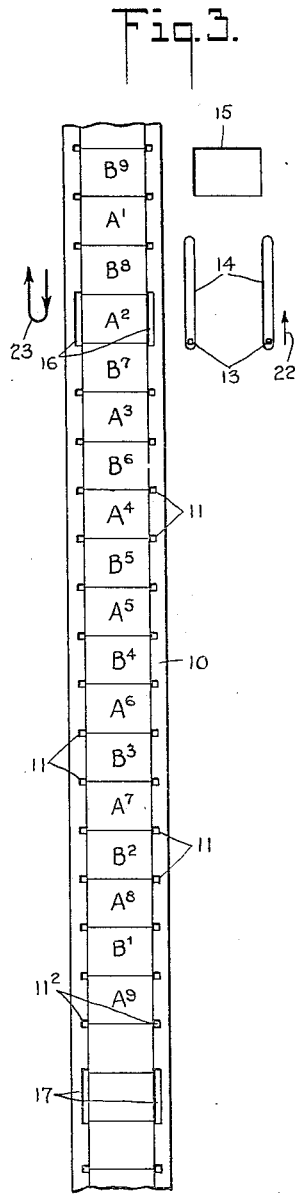
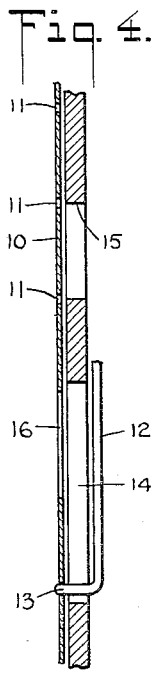
INVENTOR
Freeman H. Owens
BY
Cavanagh + James
ATTORNEYS Patented Jan. 8, 1929.

1,698,106

UNITED STATES PATENT OFFICE.

FREEMAN H. OWENS, OF NEW YORK, N. Y.

MOTION-PICTURE APPARATUS.

Application filed January 27, 1926. Serial No. 83,994.

This invention relates to the art of taking or projecting motion pictures, and relates more particularly to a motion picture means for exposing a plurality of series of picture film areas or images upon movement of the film first in one direction and then in the reverse direction; and has special reference to the provision of a motion picture film having means embodied or incorporated therein for effecting a shift from one image series to the other image series when the direction of motion of the film is reversed.

It has heretofore been suggested to expose a plurality of series of images or image areas on a motion picture film by moving the film first in one direction and then in the reverse or opposite direction so that a first series of images may be exposed with the film moved in one direction and a second series of images exposed during the rewinding motion of the film or so that two series of images may be exposed continuously, as by continuous motion of the film in its opposite directions.

To accomplish these results various designs of apparatus have been devised, typical among which are those which embody means for shifting the film or moving the objective laterally or/and moving the film exposure window during a shift from one image series to the other upon reversing the direction of movement of the film. To obviate the disadvantages incident to employing such means for shifting the parts of the motion picture apparatus and to generally simplify the construction of motion picture machines for projecting such plural series of images, I have devised motion picture feeding mechanism which is automatically operative for effecting a shift from one image series to the other upon reversing the operation of the film feeding mechanism as disclosed and claimed in my Patent No. 1,563,394, of Dec. 1, 1925, and in my co-pending application to motion picture apparatus, Ser. No. 77,498, filed Dec. 24, 1925.

A principal object of my present invention comprehends the provision of an improvement in this type of motion picture apparatus in which the means for effecting a shift from one image series to the other upon reversing the direction of motion of the film is incorporated or embodied in the film itself and the film so constructed as to cooperate with known film feeding mechanism for changing from one image series to the other upon reversing the direction of operation of the film feeding mechanism, the construction being such that the means hitherto suggested for moving the film gate, the objective or the film exposure window is rendered unnecessary and such that motion picture machines embodying standard film moving mechanism may be employed for accomplishing the desired results in a simplified way.

A more specific principal object of my present invention comprehends the provision of a motion picture film having a plurality of series of images arranged in longitudinal alignment with the images of one series disposed in alternation with the images of another series, the said film embodying means for permitting movement of the film in one or the opposite direction two image spaces at a time to expose consecutively the images of one or of the other image series and embodying means adapted for cooperation with standard motion picture film feeding mechanism for permitting a shift from one image series to the other when the direction of motion of the film is reversed whereby the same film can be moved endlessly by reversing a direction of operation of standard film feeding mechanism.

To the accomplishment of the foregoing and such other objects as will hereinafter appear, my invention consists in the elements and their relation one to the other, as more particularly described hereinafter and sought to be defined in the claims; reference being had to the accompanying drawings which show a preferred embodiment of my invention, and in which:

Fig. 1 is a view of the motion picture film embodying the principles of my present invention showing the relation of the film to the exposure window and film feeding mechanism at the beginning of a cycle of operation of film movement, Fig. 2 is a view of the same showing the film related to the exposure window and film feeding mechanism at the beginning of a shift from one image series to the other, Fig 3 is a view of the same showing the relation of the parts during a shift from the second image series to the first, completing the cycle of film movement, and Fig. 4 is an enlarged cross-sectional view showing the structural relations between the film, the film exposure window and the film moving mechanism.

Referring now more in detail to the drawings and having reference first to Fig. 1 thereof, the motion picture film embodying my invention comprises a picture element 10 having a plurality such as a pair of series of images designated respectively A, A', A²—A⁹ for one series and B, B', B²—B⁹ for the second series, the image series A being in the preferred embodiment of the invention arranged in alternation with the images of the series B, the images constituting the series of the first of the pair being arranged sequentially for film running in one direction, and the images of the series constituting the second of the pair being arranged for film running in the opposite direction, as indicated by the exponents 1, 2, 3, etc., of the designations of the images. While I refer for convenience of description to the images as constituting a plurality of series, it will be understood that all of the images may sequentially relate to one as well as a plurality of subjects. It will also be understood that while in the preferred embodiment of the invention the invention the images of both series are arranged in longitudinal alignment and in alternation, that the images of said series may be otherwise disposed on the film to accomplish the same results.

For intermittently feeding the film element 10, the same is provided with a plurality of feed apertures 11, 11 arranged on opposite sides of the film, each image space or area being preferably provided with a pair of film feeding apertures, the same being disposed between adjacent images and spaced longitudinally the length of an image area, as clearly shown in the drawings, the said film feed apertures cooperating with feeding mechanism preferably of the intermittent grip type of well known construction, such as claw means 12, having fingers 13, 13 movable in slots 14, 14 forming part of the usual film gate and adapted for entering the film apertures 11 for feeding the film. In this type of film feeding mechanism the fingers of the claw means describe a closed loop orbit in their motion, the operation being such that the fingers partake of a movement which consists in a movement of the fingers in one direction in the slots 14, 14, a withdrawal of such fingers when the same reach the ends of the slots followed by a movement of the fingers in the opposite direction, and then a return movement of the fingers into the slots 14, 14, this cycle being then repeated. The film moving mechanism 12 is operated with a double shift, so that the film may be moved two picture areas at a time, and the slots 14, 14 therefore have a length substantially equal to the height or length of two picture images. For exposing a film area, the usual film exposure window 15 is provided.

As heretofore stated, a principal object of my present invention comprehends the provision of a motion picture film in which means is incorporated or embodied in the film itself for permitting a shift from one image series to the other upon reversing the direction of motion of the film so that standard film feeding mechanism may be employed for sequentially exposing the images of both picture series. This means comprises an elongated film feeding aperture or cut-out portion associated with an end of an image series when it is desired merely to complete one cycle of film movement or associated with the ends of both image series when it is desired to produce a number of cycles of film movement, as for continuous projection of the film. In the drawings, these cut-out portions or elongated film feeding apertures are associated with the ends of both image series and comprise a pair of cut-out portions 16 for the upper end of the film and a second pair of cut-out portions 17 for the lower end of the film, the said cut-out portions being located on the film spaced from the ends thereof depending upon the relative location or displacement between the film exposure window 15 and the film gate slots 14, 14. These apertures or cut-outs 16 and 17 have a length, as will be observed from the drawings, equal substantially to the length or height of a picture area.

With this construction of the film, it will now be evident that the film may be moved in its opposite directions for exposing the images of both series, a shift from one series to the other taking place upon reversing the direction of operation of the film moving mechanism 12 to reverse the direction of motion of the film element 10, a complete cycle of operation being depicted in Figs. 1, 2 and 3 of the drawings.

In Fig. 1 of the drawings, the parts of the apparatus are in cooperative relation for moving the film element 10 upwardly as indicated by the arrow 18, the first image A' of the image series A being opposite the film window 15 for exposure, and the film feeding pins 13, 13 being in position for engaging the film feeding apertures 11', this relation of parts being shown both in Figs. 1 and 4 of the drawings. It will now be evident that when the film feeding mechanism is moved upwardly in the direction shown by the arrow 19, the film will be given a double shift, bringing the image A² in position for exposure through the exposure window 15. Upon continued operation of the film feeding mechanism, the remaining image areas of the image series A will be exposed until the last image A⁹ of this series will be presented for exposure at the window 15, as shown in Fig. 2 of the drawings.

After exposure of the first image series, the direction of operation of the film feeding mechanism 13 is reversed; and having now reference to Fig. 2 of the drawings, it will be apparent that when the direction of operation of the same is reversed and the pins 13, 13 are moved in the direction represented by the arrow 20, the feeding pins will first enter the upper ends of the shifting apertures or cut-out portions 17, and will then move in these cut-outs until they engage the bottoms of the same without effecting a movement of the film, continued movement of the film feeding mechanism to the end of the double shift thereof producing a movement of the film equal to one instead of two picture areas, bringing the first image B' of the second series B into registry with the exposure window 15. A shift from one series to the other is thus produced by the cooperation of the cut-out portions or apertures 17 and the film feeding mechanism 12. This is indicated in Fig. 2 by the reversible arrow 21. Upon the next operation of the film moving mechanism, the film feeding apertures $11^2$ are engaged by film feeding mechanism for bringing the second image $B^2$ of the series into position for exposure, and this is repeated until the last of the image series $B^9$ is exposed, as shown in Fig. 3 of the drawings.

The shift from the second image series to the first is depicted in Fig. 3 of the drawings, and is effected by reversing the direction of operation of the film feeding mechanism 13 as indicated by the arrow 22, Fig. 3 of the drawings, for changing the direction of motion of the film as indicated by the reversible arrow 23 in said figure. When the direction of operation of the film feeding mechanism is reversed, the pins 13 will first engage the bottoms of the cut-outs 16 and will move in the cut-outs the length of an image area without effecting any movement of the film, continued operation of the film feeding mechanism thereafter producing a film shift of only one image area by the engagement of the pins 13 with the tops of the cut-outs 16, this shift bringing the first image A' of the image series A into position for exposure at the window 15, as shown in Fig. 1 of the drawings. Continued operation of the film feeding mechanism will repeat the cycle described.

The manner of making and using the film feeding mechanism and the motion picture film of my present invention and the advantages thereof will in the main be fully apparent from the above detailed description of the construction and cycle of operation thereof. It will further be seen that the images of both series may be displaced longitudinally of the film in any desired way, and the cut-out portions or elongated feed apertures disposed relatively thereto to effect the shift of one image series to the other upon reversing the operation of the film feeding mechanism. It will also be seen that should the film feeding mechanism move the film in either direction one or a number of image spaces past the image series, the reversing of the operation of the film moving mechanism will nevertheless accomplish the desired results. This will be understood by a reference, for example, to Fig. 2 of the drawings, and assuming that the film feeding pins are continued in operation in the direction shown in Fig. 1 of the drawings, whereby the pair of apertures $11^3$ are engaged, this will bring a blank space 24 into position for exposure, and upon reversing the direction of motion of the film moving mechanism, the image $A^9$ will again be brought into position for exposure, after which a shift to the second image series will be produced. Other advantages of the invention will be apparent from the structure disclosed, and it will be further apparent that many changes and modifications may be made in the film and the parts associated therewith without departing from the spirit of the invention, defined in the following claims.

I claim:

1. A motion picture film comprising a picture element having a plurality of series of images, the images of one series being arranged in alternation with the images of the other series, the said images being sequentially disposed on the picture element for exposing one series when the film is moved in one direction and for exposing the other series when the film is moved in the opposite direction, said film being provided with feed apertures adapted to receive a film feeding mechanism for moving the film in opposite directions, and means in said film associated with the end of an image series adapted for cooperation with the film feeding mechanism for effecting a shift from one series to the other upon reverse operation of the film feeding mechanism.

2. A motion picture film comprising a picture element having a plurality of series of images, the images of one series being arranged in alternation with the images of the other series, the said images being sequentially disposed on the picture element for exposing one series when the film is moved in one direction and for exposing the other series when the film is moved in the opposite direction, said film being provided with feed apertures adapted to receive a film feeding mechanism for moving the film in opposite directions, and means in said film associated with the ends of both image series adapted for cooperation with the film feeding mechanism for effecting a shift from one series to the other upon reverse operation of the film feeding mechanism.

3. A motion picture film comprising a picture element having a plurality of series of images, the images of one series being arranged in alternation with the images of the other series, the said images being sequentially disposed on the picture element for exposing one series when the film is moved in one direction and for exposing the other series when the film is moved in the opposite direction, said film being provided with feed apertures adapted to receive a film feeding mechanism for moving the film in opposite directions, and an elongated feed aperture in said film associated with the end of an image series adapted for cooperation with the film feeding mechanism for effecting a shift from one series to another upon reverse operation of the film feeding mechanism.

4. A motion picture film comprising a picture element having a plurality of series of images, the images of one series being arranged in alternation with the images of the other series, the said images being sequentially disposed on the picture element for exposing one series when the film is moved in one direction and for exposing the other series when the film is moved in the opposite direction, said film being provided with feed apertures adapted to receive a film feeding mechanism for moving the film in opposite directions, and a cut-out in said film associated with the ends of both image series for serving as a feed aperture for film movement in both directions and cooperating with the film feeding mechanism for effecting a shift from either series to the other upon reverse operation of the film feeding mechanism.

5. A motion picture film comprising a picture element having a plurality of series of images, the images of one series being arranged in alternation with the images of the other series, the said images being sequentially disposed on the picture element for exposing one series when the film is moved in one direction and for exposing the other series when the film is moved in the opposite direction, said film being provided with feed apertures spaced longitudinally of the film, the spaces between adjacent apertures being substantially equal to the length of a picture area, and a feed aperture in length substantially equal to the length of the picture area associated with an end of an image series and adapted for cooperation with a film feeding mechanism for effecting a shift from one series to another upon reverse operation of the film feeding mechanism.

6. A motion picture film comprising a picture element having a plurality of series of images, the images of one series being arranged in alternation with the images of the other series, the said images being sequentially disposed on the picture element for exposing one series when the film is moved in one direction and for exposing the other series when the film is moved in the opposite direction, said film being provided with feed apertures spaced longitudinally of the film, the spaces between adjacent apertures being substantially equal to the length of a picture area, and feed apertures associated with both ends of both image series consisting of cut-out portions equal in length to the length of a picture area and adapted for cooperation with a film feeding mechanism for effecting a shift from either series to the other upon reverse operation of the film feeding mechanism.

7. In combination, a film exposure window, a motion picture film adapted to move past said exposure window and comprising a picture element having a plurality of series of images, the images of one series being arranged in alternation with the images of the other series, the said images being sequentially disposed on the picture element for exposing one series when the film is moved in one direction and for exposing the other series when the film is moved in the opposite direction, a film feeding mechanism for moving said film two picture images at a time, said film being provided with feed apertures cooperating with the film feeding mechanism, and means in said film associated with an end of an image series adapted for cooperation with said film feeding mechanism to feed said film only one picture area for effecting a shift from one series to the other upon reverse operation of the film feeding mechanism.

8. In combination, a film exposure window, a motion picture film adapted to move past said exposure window and comprising a picture element having a plurality of series of images, the images of one series being arranged in alternation with the images of the other series, the said images being sequentially disposed on the picture element for exposing one series when the film is moved in one direction and for exposing the other series when the film is moved in the opposite direction, a film feeding mechanism for moving said film two picture images at a time, said film being provided with feed apertures cooperating with the film feeding mechanism, and elongated film feed apertures associated with the ends of both image series adapted for cooperation with said film feeding mechanism to feed said film only one picture area for effecting a shift from either series to the other upon reverse operation of the film feeding mechanism.

9. A motion picture film comprising a picture element having a plurality of series of images disposed on the film for sequential exposure upon moving the film in opposite directions, the images of one series being displaced longitudinally of the film relative to the images of the other series, the said film being provided with feed apertures adapted to receive the film feeding mechanism for moving the film in opposite directions, and means in said film associated with an end of an image series cooperating with the film feeding mechanism for effecting a shift from one series to the other upon reverse operation of the film feeding mechanism.

10. A motion picture film comprising a picture element having a plurality of series of images disposed on the film for sequential exposure upon moving the film in opposite directions, the images of one series being displaced longitudinally of the film relative to the images of the other series, the said film being provided with elongated feed apertures associated with the ends of both image series adapted for cooperation with the film feeding mechanism for effecting a shift from either series to the other upon reverse operation of the film feeding mechanism.

Signed at New York city, in the county of New York and State of New York this 26th day of January, A. D. 1926.

FREEMAN H. OWENS.